US012608376B2

(12) United States Patent
Guo et al.

(10) Patent No.: US 12,608,376 B2
(45) Date of Patent: Apr. 21, 2026

(54) RETRIEVAL SYSTEM PIPELINE FOR RETRIEVAL-AUGMENTED GENERATION

(71) Applicant: Oracle International Corporation, Redwood Shores, CA (US)

(72) Inventors: Mengqing Guo, Redmond, WA (US); Xin Zhang, Seattle, WA (US); Zheng Wang, Sammamish, WA (US); Yazhe Hu, Bellevue, WA (US); Zhonghai Deng, Redmond, WA (US); Tao Sheng, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/826,023

(22) Filed: Sep. 5, 2024

(65) Prior Publication Data

US 2026/0064684 A1 Mar. 5, 2026

(51) Int. Cl.
*G06F 16/24* (2019.01)
*G06F 16/2453* (2019.01)

(52) U.S. Cl.
CPC .............................. *G06F 16/24542* (2019.01)

(58) Field of Classification Search
CPC ................................................ G06F 16/24542
See application file for complete search history.

(56) References Cited

U.S. PATENT DOCUMENTS

2024/0386015 A1* 11/2024 Crabtree ............. G06F 16/9024
2025/0131247 A1* 4/2025 Mondlock ............ G06N 3/0475

* cited by examiner

*Primary Examiner* — Ajay M Bhatia
*Assistant Examiner* — Cindy Nguyen
(74) *Attorney, Agent, or Firm* — Invoke

(57) ABSTRACT

In some embodiments, a system transforms an initial user query into a first rewritten query using a first query rewriting algorithm, executes a search of a data repository using the first rewritten query to generate a set of results, executes a chunking process on the set of results to generate chunks of data, transforms the initial user query into a second rewritten query using a second query rewriting algorithm, generates corresponding embeddings for the second rewritten query and the chunks of data using a reranking model, selects a subset of the chunks of data based on a comparison of the embeddings for the chunks of data and the embedding for the initial user query, generates a prompt based on the initial user query and the subset of the chunks of data, submits the prompt to a Large Language Model (LLM) to generate a response to the initial user query.

20 Claims, 4 Drawing Sheets

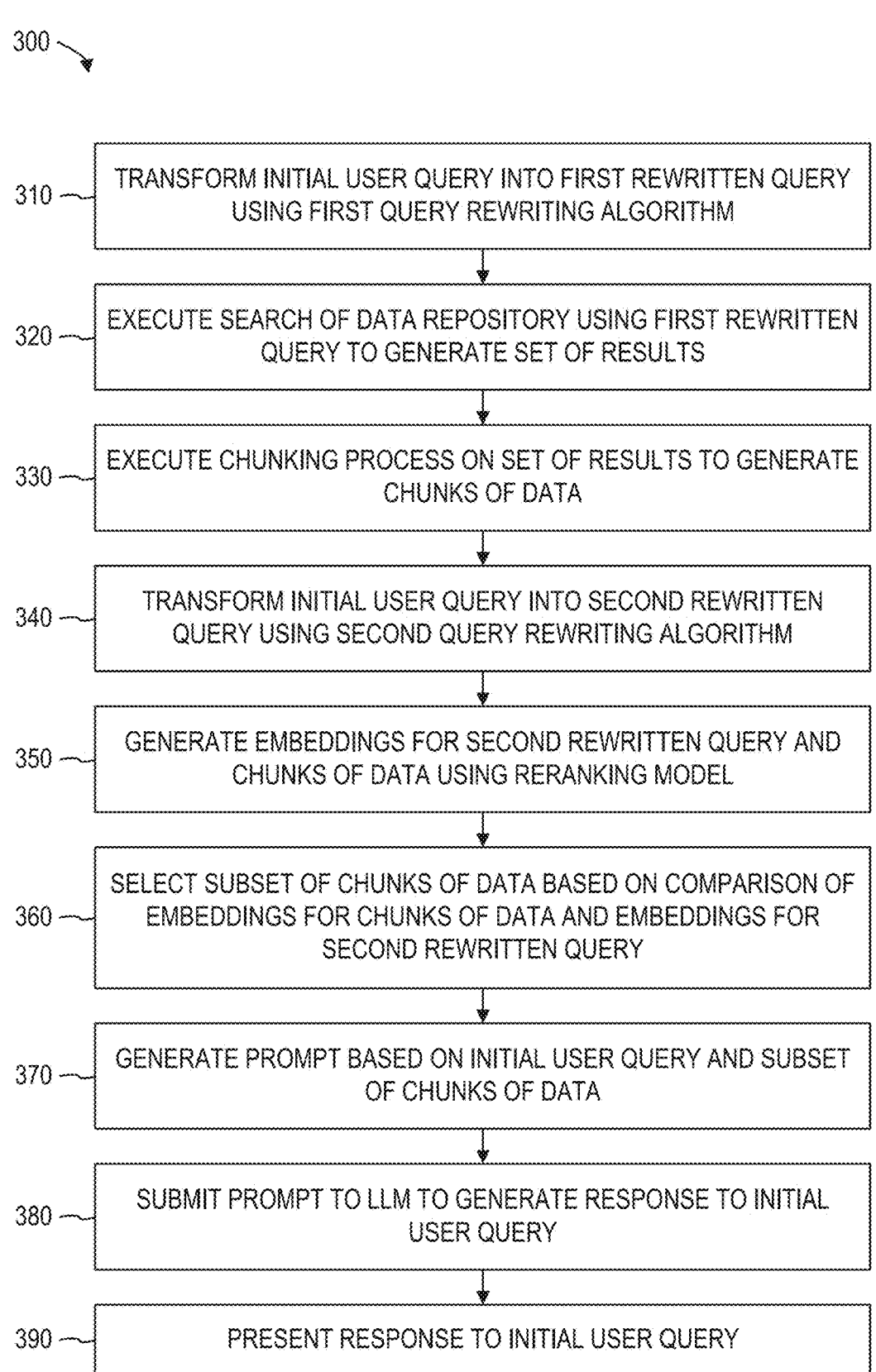

300

310 — TRANSFORM INITIAL USER QUERY INTO FIRST REWRITTEN QUERY USING FIRST QUERY REWRITING ALGORITHM

320 — EXECUTE SEARCH OF DATA REPOSITORY USING FIRST REWRITTEN QUERY TO GENERATE SET OF RESULTS

330 — EXECUTE CHUNKING PROCESS ON SET OF RESULTS TO GENERATE CHUNKS OF DATA

340 — TRANSFORM INITIAL USER QUERY INTO SECOND REWRITTEN QUERY USING SECOND QUERY REWRITING ALGORITHM

350 — GENERATE EMBEDDINGS FOR SECOND REWRITTEN QUERY AND CHUNKS OF DATA USING RERANKING MODEL

360 — SELECT SUBSET OF CHUNKS OF DATA BASED ON COMPARISON OF EMBEDDINGS FOR CHUNKS OF DATA AND EMBEDDINGS FOR SECOND REWRITTEN QUERY

370 — GENERATE PROMPT BASED ON INITIAL USER QUERY AND SUBSET OF CHUNKS OF DATA

380 — SUBMIT PROMPT TO LLM TO GENERATE RESPONSE TO INITIAL USER QUERY

390 — PRESENT RESPONSE TO INITIAL USER QUERY

*FIG. 3*

RETRIEVAL SYSTEM PIPELINE FOR RETRIEVAL-AUGMENTED GENERATION

The present disclosure relates to an information retrieval system. In particular, the present disclosure relates to a retrieval system for use in a retrieval-augmented generation (RAG) architecture.

BACKGROUND

Retrieval-augmented generation (RAG) is an artificial intelligence framework that combines generative large language models (LLMs) with information retrieval systems. This natural language processing technique is commonly used to make LLMs more accurate, relevant, and up to date. LLMs can understand, summarize, generate, and predict new content. However, LLMs can still be inconsistent and fail at some knowledge-intensive tasks, such as tasks that are outside of their initial training data or those tasks that require up-to-date information. By retrieving information from sources other than training data, the quality of LLM responses improves. Retrieving information from these other sources enables the LLM to access current information that it was not used to train the LLM.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates an example set of operations for implementing a retrieval system pipeline in a RAG architecture in accordance with one or more embodiments.

DETAILED DESCRIPTION

Figure 1:
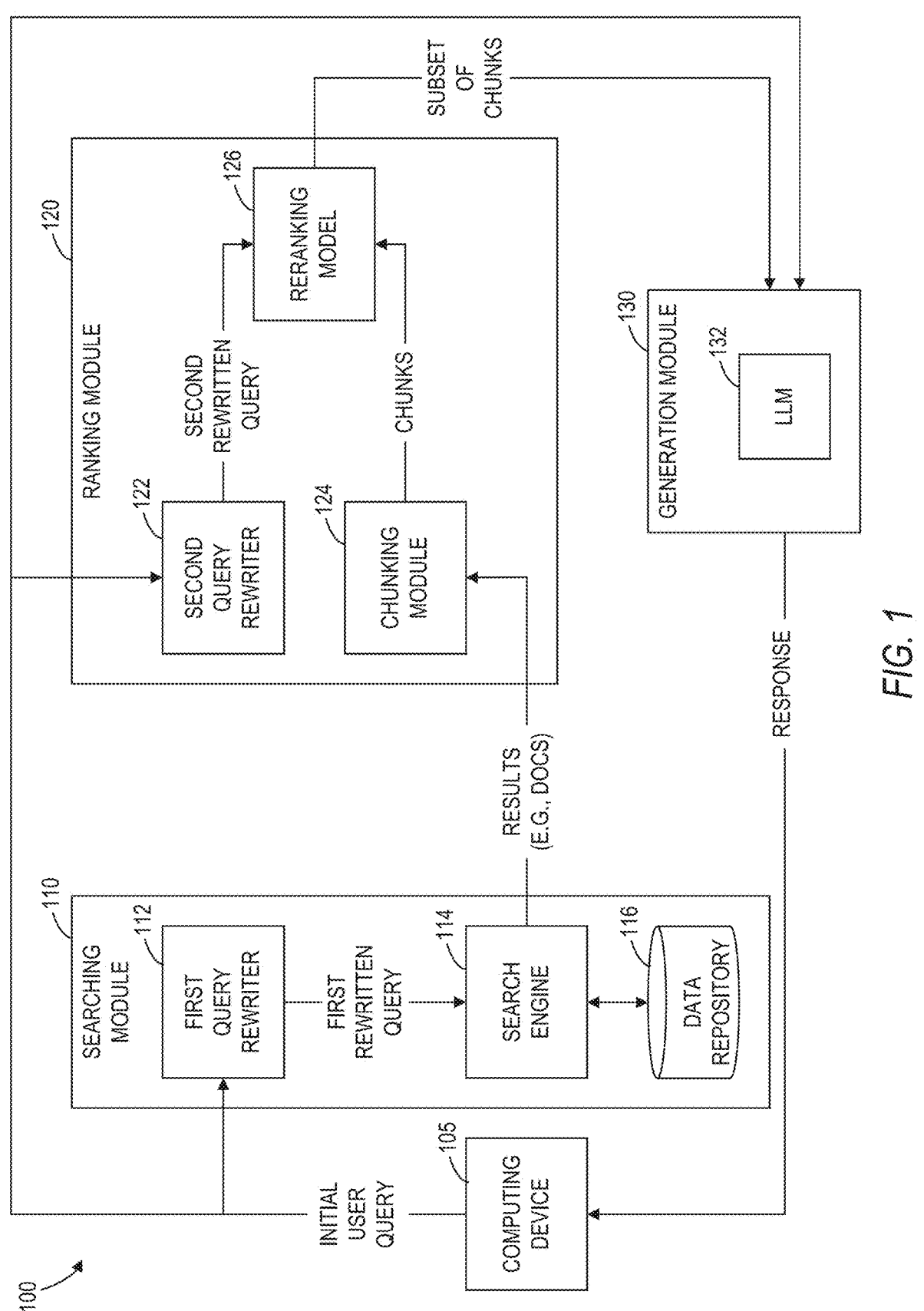
FIG. 1 illustrates a system implementing a retrieval system pipeline in a RAG architecture in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. RAG ARCHITECTURE
3. IMPLEMENTING A RETRIEVAL SYSTEM PIPELINE IN A RAG ARCHITECTURE

4. COMPUTER NETWORKS AND CLOUD NETWORKS
5. HARDWARE OVERVIEW
6. MISCELLANEOUS; EXTENSIONS

1. GENERAL OVERVIEW

The present disclosure describes techniques for implementing a retrieval system pipeline in a RAG architecture. The retrieval system pipeline quickly and accurately retrieves relevant information from a large-scale corpus by using the techniques described herein. As a result, the retrieval system pipeline enhances the quality and relevance of the responses generated by the RAG architecture. The retrieval system pipeline may include two phases—searching and ranking.

One or more embodiments optimize the speed and accuracy of the searching phase of the retrieval system pipeline by using a first query rewriting algorithm to transform an initial user query into a first rewritten query and using a second query rewriting algorithm to transform the initial user query into a second rewritten query. The second query rewriting algorithm is different from the first query rewriting algorithm. For example, the first query rewriting algorithm may focus on transforming the initial user query to a format that is optimized for a search engine, generating the first rewritten query to include keywords of the initial user query and to omit stop words of the initial user query, whereas the second query rewriting algorithm may focus on semantical metamorphosis, generating the first rewritten query to be semantically equivalent to the initial user query and grammatically different from the initial user query. In some embodiments, the system executes a search of a data repository using the first rewritten query to generate a set of results, executes a chunking process on the set of results to generate chunks of data, generates corresponding embeddings for the second rewritten query and the chunks of data using a reranking model. The system may then select a subset of the chunks of data based on a comparison of the embeddings for the chunks of data and the embedding for the second rewritten query, generate a prompt based on the initial user query and the subset of the chunks of data, and submit the prompt to a first Large Language Model (LLM) to generate a response to the initial user query.

One or more embodiments optimize an embedding model of a reranking model to generate corresponding embeddings that more accurately represent the meaning of the second rewritten query and the chunks of data by using a decoder-only model to generate the corresponding embeddings. The system may modify the decoder-only model to act as an encoder by appending an end-of-sequence (EOS) token to the end of the corresponding token sequences of the second rewritten query and the chunks of data prior to their input into the decoder-only model. In some embodiments, the system generates the corresponding embedding for the second rewritten query by translating the second rewritten query into a sequence of tokens having an end, appending an EOS token to the end of the sequence of tokens of the second rewritten query to generate an input sequence, inputting the input sequence into a decoder-only model, and extracting the corresponding embedding of the second rewritten query from an embedding layer of the decoder-only model. In some embodiments, the system generates the corresponding embeddings for the chunks of data by, for each chunk in the chunks of data, translating the chunk into a sequence of tokens having an end, appending an EOS token to the end of the sequence of tokens of the chunk to generate an input sequence, inputting the input sequence into the decoder-only model, and extracting the corresponding embedding of the chunk from the embedding layer of the decoder-only model.

One or more embodiments described in this Specification and/or recited in the claims may not be included in this General Overview section.

2. RAG ARCHITECTURE

FIG. 1 illustrates a system 100 implementing a retrieval system pipeline in a RAG architecture in accordance with one or more embodiments. As illustrated in FIG. 1, in some embodiments, system 100 includes a searching module 110, a ranking module 120, and a generation module 130. The system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The components of the system 100 may communicate with one another via one or more computer networks. Furthermore, one or more components of the system 100 may be implemented as part of a cloud network. Additional embodiments and/or examples relating to computer networks are described below in Section 4, titled "Computer Networks and Cloud Networks."

In some embodiments, the searching module 110 and ranking module 120 form the retrieval system pipeline for the RAG architecture. The searching module 110 may be configured to execute the searching phase of the retrieval system pipeline, generating a set of results. The ranking module 120 may be configured to execute the ranking phase of the retrieval system pipeline, selecting a subset of the results for use by the generation module 130. In the example shown in FIG. 1, the searching module 110 comprises a first query rewriter 112, a search engine 114, and a data repository 116. Furthermore, in the example shown in FIG. 1, the ranking module 120 comprises a second query rewriter 122, a chunking module 124, and a reranking model 126.

In an embodiment, the first query rewriter 112 is configured to transform an initial user query into a first rewritten query using a first query rewriting algorithm. The initial user query may comprise a natural language prompt submitted by a user via a computing device 105. However, the initial user query may comprise content other than a natural language prompt. Furthermore, the initial user query may be obtained in ways other than a user submitting the initial user query via a computing device 105. In some embodiments, the first query rewriting algorithm is configured to generate the first rewritten query to include keywords of the initial user query and to omit stop words (e.g., a set of commonly used words that are filtered out before processing natural language) of the initial user query. For example, the first query rewriting algorithm may use a set of rules to filter out stop words from the initial user query in generating the first rewritten query, thereby resulting in only keywords from the initial user query being included in the first rewritten query. The set of rules may use a stop list that identifies the stop words to filter out in the generation of the first rewritten query.

In one or more embodiments, the search engine 114 is configured to execute a search of the data repository 116 using the first rewritten query to generate a set of results. In some embodiments, the data repository 116 is any type of storage unit and/or device (e.g., a file system, database, collection of tables, or any other storage mechanism) for storing data. Further, the data repository 116 may include multiple different storage units and/or devices. The multiple different storage units and/or devices may or may not be of the same type or located at the same physical site.

In some embodiments, the data repository 116 stores documents and the set of results comprises a set of documents. However, the data repository 116 may store and the set of results may comprise information in any format that may be stored in the data repository, searched, and retrieved. Examples of other types of results include, but are not limited to, other types of files that contain textual data, files that contain video data, and files that contain audio data.

In some embodiments, the chunking module 124 is configured to execute a chunking process on the set of results generated by the search engine 114, thereby generating chunks of data. In one or more embodiments, the chunking process uses fixed-length chunking to generate the chunks of data as being equal in size. Fixed-length chunking is a method of text segmentation in which text is divided into equal-sized chunks based on a predetermined number of units, such as characters, words, sentences, tokens, or bytes. As part of the fixed-length chunking, the chunking module 124 may create overlapping chunks of data. For example, if a single paragraph in one of the results has five sentences total, the fixed-length chunking may split the paragraph of five sentences into two chunks of data, where the first chunk includes the first three sentences of the paragraph and the second chunk includes the last three sentences of the paragraph, thereby resulting in both chunks including the third sentence in the middle of the paragraph.

In other embodiments, the chunking process uses semantic chunking to group data based on context of the data. For example, the chunking process may use semantic chunking by computing the embeddings of every sentence in a document, comparing the similarity of all sentences in the document with each other based on their embeddings, and then grouping sentences with the most similar embeddings together in chunks. Alternatively, the semantic chunking used by the chunking process may include splitting up the text of a document based on separators or the position of the text in the document.

In an embodiment, the second query rewriter 122 is configured to transform the initial user query into a second rewritten query using a second query rewriting algorithm that is different from the first query rewriting algorithm. The second query rewriting algorithm may comprise generating the first rewritten query to be semantically equivalent to the initial user query and grammatically different from the initial user query. For example, the second query rewriting algorithm may transform the initial user query into the second rewritten query by changing the syntax or the tense of the initial user query without changing the meaning of the initial user query.

In one or more embodiments, the reranking model 126 is configured to generate corresponding embeddings for the second rewritten query and the chunks of data. Each embedding may comprise a real-valued vector that encodes the meaning of the target text—the second rewritten query or the chunk of data—in such a way that the target text that are closer in the vector space are expected to be similar in meaning. In some embodiments, the reranking model 126 includes an LLM that is configured to generate the embeddings. The LLM may be an artificial neural network built with a decoder-only transformer-based architecture. Other configurations of the reranking model 126 to generate the embeddings are also within the scope of the present disclosure.

In some embodiments, the reranking model 126 is configured to select a subset of the chunks of data based on a comparison of the embeddings for the chunks of data and the embedding for the second rewritten query. The reranking model 126 may be configured to, for each chunk in the chunks of data, calculate a corresponding similarity metric between the embedding for the chunk and the embedding for the second rewritten query. In some embodiments, the similarity metric is a cosine similarity. However, other types of similarity metrics are also within the scope of the present disclosure. The reranking model 126 may use the similarity metrics for the chunks of data to select the subset of the chunks of data. In some embodiments, the reranking model 126 is configured to rank the chunks of data based on their corresponding similarity metrics and to select a portion of the highest ranking chunks of data (e.g., select the ten chunks of data that have the highest cosine similarities amongst the chunks of data). In other embodiments, the reranking model 126 is configured to select each chunk of data that has a corresponding similarity metric that exceeds a particular threshold value. The reranking model 126 may be configured to use other techniques for selecting the subset of the chunks of data based on a comparison of the embeddings for the chunks of data and the embedding for the second rewritten query.

In an embodiment, the generation module 130 is configured to generate a prompt based on the initial user query and the subset of the chunks of data selected by the reranking model 126. The prompt may include the initial user query and the subset of the chunks of data. For example, the generation module 130 may be configured to generate the prompt using one or more rules for combining the initial user query and the subset of the chunks of data. In some embodiments, the generation module 130 uses an LLM to generate the prompt, such as by prompting the LLM to generate the prompt using the initial user query and the subset of the chunks of data. Other ways of generating the prompt based on the initial user query and the subset of the chunks of data are also within the scope of the present disclosure.

In one or more embodiments, the generation module 130 comprises an LLM 132 that is configured to generate responses to initial user queries. In some embodiments, the generation module 130 is configured to submit the prompt to the LLM 132 to generate a response to the initial user query. In one example, the generation module 130 is configured to feed the prompt as input into the LLM 132.

In some embodiments, the generation module 130 is configured to present the response to the initial user query on a computing device 105. The generation module 130 may present the response on the same computing device 105 via which the initial user query was submitted. In one or more embodiments, the generation module 130 is configured to trigger the presentation of the response on the computing device 105 by triggering a display of the response on the computing device 105. In another embodiment, the generation module 130 is configured to trigger the presentation of the response by triggering a playing of audio describing the response on the computing device 105. Other ways of presenting the response are also within the scope of the present disclosure.

Figure 2:
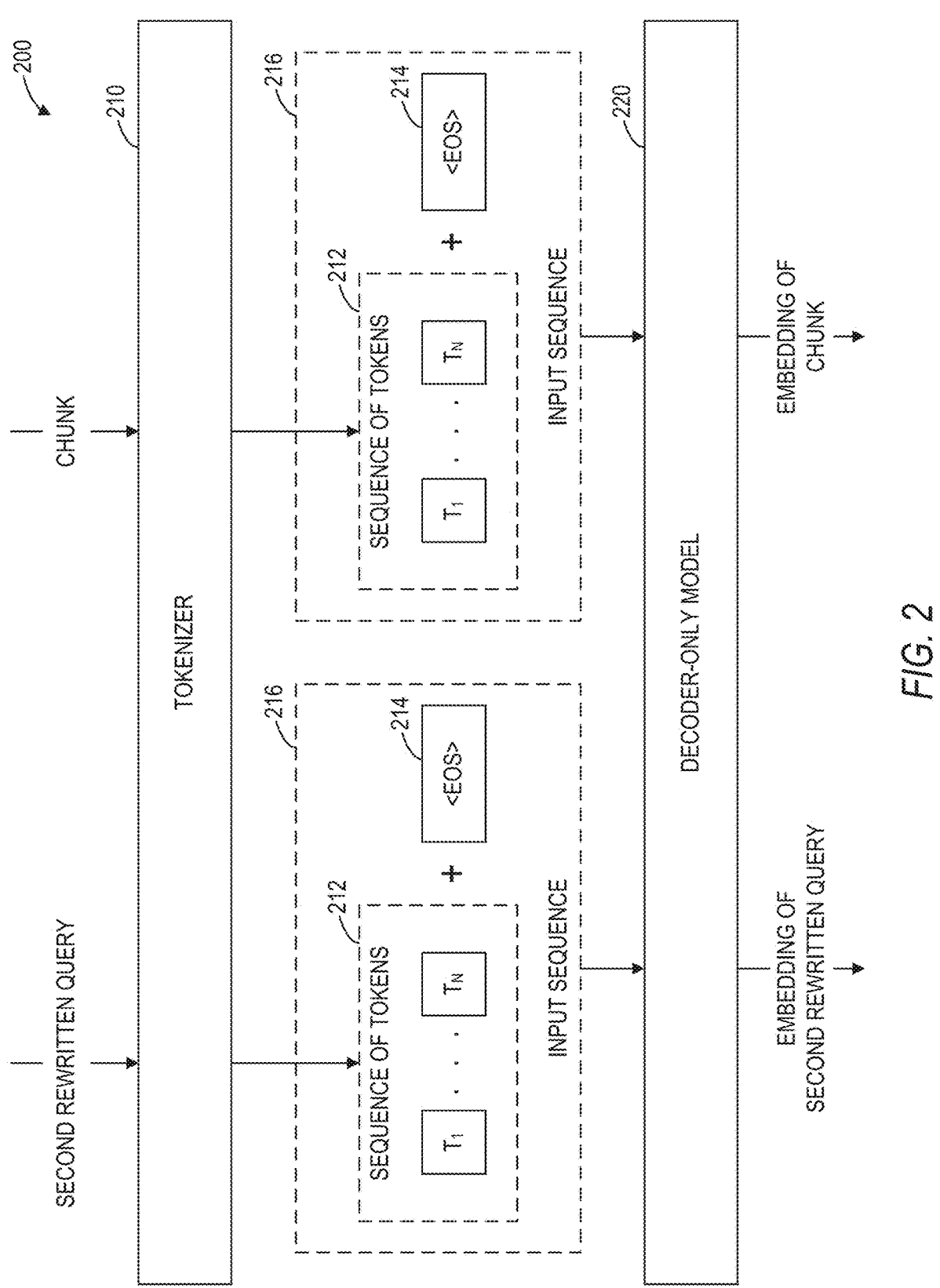
FIG. 2 illustrates an embedding model configured to generate corresponding embeddings for a query and chunks of data for use by a reranking model in accordance with one or more embodiments.

FIG. 2 illustrates an embedding model 200 configured to generate corresponding embeddings for a query and chunks of data for use by a reranking model 126 in accordance with one or more embodiments. The embedding model 200 may be incorporated into the reranking model 126. In one or more embodiments, the embedding model 200 comprises a tokenizer 210 and a decoder-only model 220. In some embodiments, the embedding model 200 is configured to generate corresponding embeddings that more accurately represent the meaning of the second rewritten query and the chunks of data by using the decoder-only model 220 to generate the corresponding embeddings. The embedding model 200 modifies the decoder-only model 220 to function as an encoder by appending an end-of-sequence (EOS) token 214 to the end of the corresponding token sequences 212 of the second rewritten query and the chunks of data prior to their input into the decoder-only model 220.

In one or more embodiments, the tokenizer 210 is configured to convert the second rewritten query and each chunk in the chunks of data into a corresponding sequence of tokens 212 (e.g., a sequence of tokens $T_1$ to $T_N$). In some embodiments, the embedding model 200 is configured to append an EOS token 214 to the end of the sequence of tokens 212 of the second rewritten query to generate an input sequence 216 for the second rewritten query. Similarly, in some embodiments, the embedding model 200 is also configured to, for each chunk in the chunks of data, append an EOS token 214 to the end of the sequence of tokens 212 of the chunk to generate an input sequence 216 for the chunk.

In one or more embodiments, the embedding model 200 is configured to input the corresponding input sequences 216 of the second rewritten query and the chunks of data into the decoder-only model 220. The decoder-only model 220 may be an LLM-based model. The embedding model 200 may be configured to obtain the last layers of the decoder-only model 220 instead of generating the next token. In some embodiments, the embedding model 200 is configured to extract the corresponding embedding of the second rewritten query and the corresponding embeddings of the chunks from an embedding layer of the decoder-only model 220. The reranking model 126 may be configured to use the embeddings extracted from the decoder-only model 220 to select a subset of the chunks of data based on a comparison of the embeddings for the chunks of data and the embedding for the second rewritten query.

In one or more embodiments, the system 100 refers to hardware and/or software configured to perform operations described herein for implementing a retrieval system pipeline in a RAG architecture. Examples of operations for implementing a retrieval system pipeline in a RAG architecture are described below with reference to FIG. 3.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. IMPLEMENTING A RETRIEVAL SYSTEM PIPELINE IN A RAG ARCHITECTURE

FIG. 3 illustrates an example set of operations 300 for implementing a retrieval system pipeline in a RAG architecture in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, the system 100 transforms an initial user query into a first rewritten query using a first query rewriting algorithm (Operation 310). The initial user query may comprise a natural language prompt submitted by a user via a computing device. However, the initial user query may comprise content other than a natural language prompt. Furthermore, the initial user query may be obtained in ways other than a user submitting the initial user query via a computing device. In some embodiments, the first query rewriting algorithm comprises generating the first rewritten query to include keywords of the initial user query and to omit stop words of the initial user query.

In one or more embodiments, the system 100 executes a search of a data repository using the first rewritten query to generate a set of results (Operation 320). The set of results may comprise a set of documents. However, the set of results may comprise information in any format that may be stored in the data repository, searched, and retrieved. Examples of other types of results include, but are not limited to, other types of files that contain textual data, files that contain video data, and files that contain audio data.

In some embodiments, the system 100 executes a chunking process on the set of results to generate chunks of data (Operation 330). The chunking process may use fixed-length chunking to generate the chunks of data as being equal in size and creates overlapping chunks of data. Alternatively, the chunking process comprises using semantic chunking to group data based on context of the data.

In an embodiment, the system 100 transforms the initial user query into a second rewritten query using a second query rewriting algorithm that is different from the first query rewriting algorithm (Operation 340). The second query rewriting algorithm may comprise generating the first rewritten query to be semantically equivalent to the initial user query and grammatically different from the initial user query. For example, the second query rewriting algorithm may transform the initial user query into the second rewritten query by changing the syntax or the tense of the initial user query without changing the meaning of the initial user query.

In one or more embodiments, the system 100 generates corresponding embeddings for the second rewritten query and the chunks of data using a reranking model (Operation 350). The system 100 may use an embedding model of the reranking model to encapsulate the second rewritten query and the chunks of data into dense representations in a multi-dimensional space. In some embodiments, the system 100 generates the corresponding embedding for the second rewritten query by translating the second rewritten query into a sequence of tokens having an end, appending an end-of-sequence (EOS) token to the end of the sequence of tokens of the second rewritten query to generate an input sequence, and inputting the input sequence into a decoder-only model. The system 100 may then extract the corresponding embedding of the second rewritten query from an embedding layer of the decoder-only model. In some embodiments, the system 100 generates the corresponding embeddings for the chunks of data by, for each chunk in the chunks of data, translating the chunk into a sequence of tokens having an end, appending an end-of-sequence (EOS) token to the end of the sequence of tokens of the chunk to generate an input sequence, and inputting the input sequence into a decoder-only model. The system 100 may then extract the corresponding embedding of the chunk from the embedding layer of the decoder-only model.

In some embodiments, the system 100 selects a subset of the chunks of data based on a comparison of the embeddings for the chunks of data and the embedding for the second rewritten query using the reranking model (Operation 360). The reranking model may, for each chunk in the chunks of data, calculate a corresponding similarity metric between the embedding for the chunk and the embedding for the second rewritten query. In some embodiments, the similarity metric is a cosine similarity. However, other types of similarity metrics are also within the scope of the present disclosure. The system 100 may use the similarity metrics for the chunks of data to select the subset of the chunks of data. In some embodiments, the system 100 ranks the chunks of data based on their corresponding similarity metrics and then selects a portion of the highest ranking chunks of data. For example, the system 100 may select the ten chunks of data that have the highest cosine similarities amongst the chunks of data. In other embodiments, the system 100 may select each chunk of data that has a corresponding similarity metric that exceeds a particular threshold value. Other ways of selecting the subset of the chunks of data based on a comparison of the embeddings for the chunks of data and the embedding for the second rewritten query are also within the scope of the present disclosure.

In an embodiment, the system 100 generates a prompt based on the initial user query and the subset of the chunks of data (Operation 370). The prompt may include the initial user query and the subset of the chunks of data. For example, the system 100 may generate the prompt using one or more rules for combining the initial user query and the subset of the chunks of data. In some embodiments, the system 100 may use an LLM to generate the prompt, such as by prompting the LLM to generate the prompt using the initial user query and the subset of the chunks of data. Other ways of generating the prompt based on the initial user query and the subset of the chunks of data are also within the scope of the present disclosure.

In one or more embodiments, the system 100 submits the prompt to an LLM to generate a response to the initial user query (Operation 380). In one example, the system 100 feeds the prompt as input into the LLM. In response to the system 100 submitting the prompt to the LLM, the LLM generates the response to the initial user query.

In some embodiments, the system 100 presents the response to the initial user query on a computing device (Operation 390). The system 100 may present the response on the same computing device via which the initial user query was submitted. In one or more embodiments, the system 100 triggers the presentation of the response on the computing device by triggering a display of the response on the computing device. In another example, the system 100 triggers the presentation of the response by triggering a playing of audio describing the response on the computing device. Other ways of presenting the response are also within the scope of the present disclosure.

4. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
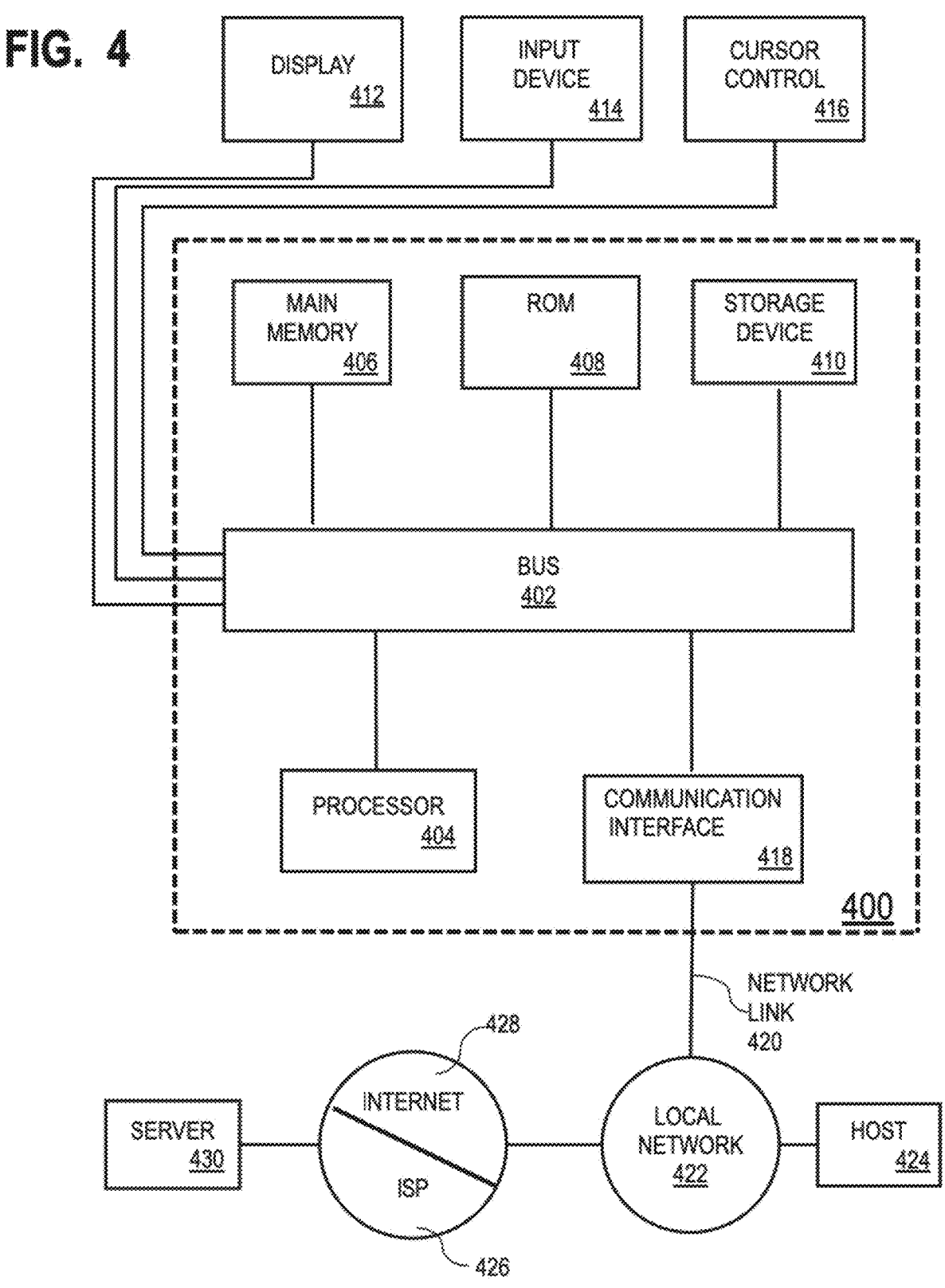
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method performed by at least one device including a hardware processor, the method comprising:

transforming an initial user query into a first rewritten query using a first query rewriting algorithm;

executing a search of a data repository using the first rewritten query to generate a set of results;

executing a chunking process on the set of results to generate chunks of data;

transforming the initial user query into a second rewritten query different from the first rewritten query using a second query rewriting algorithm that is different from the first query rewriting algorithm;

generating an embedding for the second rewritten query and embeddings for the chunks of data using a reranking model;

selecting a subset of the chunks of data based on a comparison of the embeddings for the chunks of data and the embedding for the second rewritten query, wherein the selecting of the subset of the chunks of data comprises using the embedding of the second rewritten query to select the subset of the chunks of data generated from the set of results generated using the first rewritten query;

generating a prompt based on the initial user query and the subset of the chunks of data;

submitting the prompt to a first Large Language Model (LLM) to generate a response to the initial user query; and presenting the response to the initial user query on a computing device.

2. The method of claim 1, wherein the initial user query comprises a natural language prompt submitted by a user via the computing device.

3. The method of claim 1, wherein the first query rewriting algorithm comprises generating the first rewritten query to include keywords of the initial user query and to omit stop words of the initial user query.

4. The method of claim 3, wherein the second query rewriting algorithm comprises generating the first rewritten query to be semantically equivalent to the initial user query and grammatically different from the initial user query.

5. The method of claim 1, wherein the set of results comprises a set of documents.

6. The method of claim 1, wherein the generating the embedding for the second rewritten query comprises:

translating the second rewritten query into a sequence of tokens having an end;

appending an end-of-sequence (EOS) token to the end of the sequence of tokens of the second rewritten query to generate an input sequence;

inputting the input sequence into a decoder-only model, the decoder-only model having an embedding layer; and extracting the embedding of the second rewritten query from the embedding layer of the decoder-only model.

7. The method of claim 1, wherein the generating the embeddings for the chunks of data comprises, for each chunk in the chunks of data:

translating the chunk into a sequence of tokens having an end;

appending an end-of-sequence (EOS) token to the end of the sequence of tokens of the chunk to generate an input sequence;

inputting the input sequence into a decoder-only model, the decoder-only model having an embedding layer; and extracting a corresponding embedding of the chunk from the embedding layer of the decoder-only model.

8. The method of claim 1, wherein the chunking process uses fixed-length chunking to generate the chunks of data as being equal in size and creates overlapping chunks of data.

9. The method of claim 1, wherein the chunking process comprises using semantic chunking to group data based on context of the data.

10. One or more non-transitory computer readable media comprising instructions which, when executed by one or more hardware processors, cause performance of operations comprising:

transforming an initial user query into a first rewritten query using a first query rewriting algorithm;

executing a search of a data repository using the first rewritten query to generate a set of results;

executing a chunking process on the set of results to generate chunks of data;

transforming the initial user query into a second rewritten query different from the first rewritten query using a second query rewriting algorithm that is different from the first query rewriting algorithm;

generating an embedding for the second rewritten query and embeddings for the chunks of data using a reranking model;

selecting a subset of the chunks of data based on a comparison of the embeddings for the chunks of data and the embedding for the second rewritten query, wherein the selecting of the subset of the chunks of data comprises using the embedding of the second rewritten query to select the subset of the chunks of data generated from the set of results generated using the first rewritten query;

generating a prompt based on the initial user query and the subset of the chunks of data;

submitting the prompt to a first Large Language Model (LLM) to generate a response to the initial user query; and presenting the response to the initial user query on a computing device.

11. The media of claim 10, wherein the initial user query comprises a natural language prompt submitted by a user via the computing device.

12. The media of claim 10, wherein the first query rewriting algorithm comprises generating the first rewritten query to include keywords of the initial user query and to omit stop words of the initial user query.

13. The media of claim 10, wherein the second query rewriting algorithm comprises generating the first rewritten query to be semantically equivalent to the initial user query and grammatically different from the initial user query.

14. The media of claim 10, wherein the set of results comprises a set of documents.

15. The media of claim 10, wherein the generating the embedding for the second rewritten query comprises:

translating the second rewritten query into a sequence of tokens having an end;

appending an end-of-sequence (EOS) token to the end of the sequence of tokens of the second rewritten query to generate an input sequence;

inputting the input sequence into a decoder-only model, the decoder-only model having an embedding layer; and extracting the embedding of the second rewritten query from the embedding layer of the decoder-only model.

16. The media of claim 10, wherein the generating the embeddings for the chunks of data comprises, for each chunk in the chunks of data:

translating the chunk into a sequence of tokens having an end;

appending an end-of-sequence (EOS) token to the end of the sequence of tokens of the chunk to generate an input sequence;

inputting the input sequence into a decoder-only model, the decoder-only model having an embedding layer; and extracting a corresponding embedding of the chunk from the embedding layer of the decoder-only model.

17. The media of claim 10, wherein the chunking process uses fixed-length chunking to generate the chunks of data as being equal in size and creates overlapping chunks of data.

18. The media of claim 10, wherein the chunking process comprises using semantic chunking to group data based on context of the data.

19. A system comprising:

at least one device including a hardware processor;

the system being configured to perform operations comprising:

transforming an initial user query into a first rewritten query using a first query rewriting algorithm;

executing a search of a data repository using the first rewritten query to generate a set of results;

executing a chunking process on the set of results to generate chunks of data;

transforming the initial user query into a second rewritten query different from the first rewritten query using a second query rewriting algorithm that is different from the first query rewriting algorithm;

generating an embedding for the second rewritten query and embeddings for the chunks of data using a reranking model;

selecting a subset of the chunks of data based on a comparison of the embeddings for the chunks of data and the embedding for the second rewritten query, wherein the selecting of the subset of the chunks of data comprises using the embedding of the second rewritten query to select the subset of the chunks of data generated from the set of results generated using the first rewritten query;

generating a prompt based on the initial user query and the subset of the chunks of data;

submitting the prompt to a first Large Language Model (LLM) to generate a response to the initial user query; and presenting the response to the initial user query on a computing device.

20. The system of claim 19, wherein the initial user query comprises a natural language prompt submitted by a user via the computing device.

\* \* \* \* \*